US012762113B1

(12) United States Patent
Minin

(10) Patent No.: US 12,762,113 B1
(45) Date of Patent: Oct. 13, 2026

(54) HIERARCHICAL QUERY BASED TRANSACTION EXECUTION COORDINATION SYSTEM

(71) Applicant: INTUIT INC., Mountain View, CA (US)

(72) Inventor: Aliaksei Minin, Grass Valley, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/346,294

(22) Filed: Sep. 30, 2025

(51) Int. Cl.
*G06F 16/24* (2019.01)
*G06F 16/23* (2019.01)
*G06F 16/2452* (2019.01)

(52) U.S. Cl.
CPC .... *G06F 16/2379* (2019.01); *G06F 16/24528* (2019.01)

(58) Field of Classification Search
None
See application file for complete search history.

(56) References Cited

U.S. PATENT DOCUMENTS 11,080,336 B2 * 8/2021 Van Dusen ............ G06Q 10/10
2011/0066998 A1 * 3/2011 Scandura ................ G09B 7/00 717/100
2016/0205166 A1 * 7/2016 Kolam ................ G06F 16/9574 709/213
2017/0213127 A1 * 7/2017 Duncan .................. G16B 50/30
2022/0253588 A1 * 8/2022 Sun ....................... G06F 40/154
2023/0144138 A1 * 5/2023 Peng ...................... G06N 3/045 706/12
2025/0259044 A1 * 8/2025 Crabtree ................ G06N 3/042

* cited by examiner

*Primary Examiner* — Eliyah S. Harper
(74) *Attorney, Agent, or Firm* — Patterson + Sheridan, LLP

(57) ABSTRACT

Aspects of the present disclosure relate to executing scalable, atomic data updates in a non-relational database. Aspects include receiving a tree-structured query with one or more placeholders, the tree-structured query representing relationships between multiple database objects in the non-relational database. Aspects include parsing one or more input data files from a storage location. Aspects include generating a resolved query by dynamically replacing the one or more placeholders in the tree-structured query with one or values based on data determined from the parsing of the one or more input data files and based on the relationships in the tree-structured query. Aspects include combining operations for related objects of the multiple database objects into a single atomic transaction based on the resolved query. Aspects include executing the single atomic transaction against the non-relational database.

18 Claims, 11 Drawing Sheets

400

```
{
    "s3FileRequest": {
        "bucketName": "dynamo-bulk-update-e2e",
        "prefix": "output/run1/folder"
    },
    "executionParameters": {
        "parallelFilesProcessing": false,
        "parallelRecordsProcessing": true
    },
    "dynamoMixRequest": {
        "updateNode": {
            "tableName":  "account_profile_e2e",
            "pkTemplate": "${PK}",
            "skTemplate": "${SK}",
        "updateExpressions": [
            { "expression": "#dateOfBirth.#birthDate = :processedDateOfBirth" },
            { "expression": "#dateOfDeath.#deathDate = :processedDateOfDeath" }
        ],
        "conditionExpression": "#dateOfBirth.#dobVersion = :dobVersion_num AND
                                #dateOfDeath.#dodVersion = :dodVersion_num",
        "expressionAttributeValues": {
            ":processedDateOfBirth": { "s": "${processedDateOfBirth}" },
            ":processedDateOfDeath": { "s": "${processedDateOfDeath}" },
            ":dobVersion_num": { "n": "{{func:defaultIfEmpty(${dobVersion},-1)}}"
            },
            ":dodVersion_num": { "n": "{{func:defaultIfEmpty(${dodVersion},-1)}}"
            }
        }
    }
}
```

FIG. 4

500

```
{
    "s3FileRequest": {
       "bucketName": "dynamo-bulk-update-e2e",
       "prefix": "output/run1/folder"
    },
    "executionParameters": {
        "parallelFilesProcessing": false,
         "parallelRecordsProcessing": true
    },
    "dynamoMixRequest": {
        "putNodes": [
            {
                "tableName":  "account_profile_e2e",
                "mvelCondition": "relationship != null && !relationship.isEmpty()
                                && processedGovId != null &&
                !processedGovId.isEmpty()",
            "mvelItemCustomizer": "if (associatedAccountId == null ||
                associatedAccountId.isEmpty())
                item.remove('associatedAccountId');",
                "item": {
                    "PK": {"s": "${SK}reln#${relationship}#" },
                    "SK": {"s": "govId#{{func:urlEncode(${processedGovId})}}
                        #govTyp#{{func:urlEncode(${governmentId_IdType})}}#" },
                    "associatedAccountId": { "s":"${associatedAccountId}" }
                }
            }
        }
    }
}
```

FIG. 5

600

```
{
  "s3FileRequest": {
    "bucketName": "dynamo-bulk-update-e2e",
    "prefix": "output/run1/folder"
  },
  "executionParameters": {
    "parallelFilesProcessing": false,
    "parallelRecordsProcessing": true
  },
  "dynamoMixRequest": {
    "updateNode": {
      "tableName": "account_profile_e2e",
      "pkTemplate": "acct#${accountId}#",
      "skTemplate": "acct#",
      "updateExpressions": [
        { "expression": "#dateOfBirth.#birthDate = :processedDateOfBirth" }
      ],
      "conditionExpression": "#dateOfBirth.#dobVersion = :dobVersion_num",
      "expressionAttributeValues": {
        ":processedDateOfBirth": {
          "s": "${processedDateOfBirth}"
        },
        ":dobVersion_num": {
          "n": "{{func:defaultIfEmpty(${dobVersion},-1)}}"
        }
      },
      "children": [
        {
          "tableName": "account_profile_e2e",
          "pkTemplate": "prof#${accountProfileId}#",  // extracted from root node
^^
          "skTemplate": "acct#${accountId}#",       // extracted from root node ^^
          "updateExpressions": [
            { "expression": "#metadata.#lastUpdated = :epoch_now_ms" },
            { "expression": "#namespace = :namespace" }
          ],
          "expressionAttributeValues": {
            ":epoch_now_ms": { "n": "${epoch_now_ms}" },
            ":namespace": { "s": "${namespace}" }
          }
        }
      ]
    }
  }
}
```

FIG. 6

700A

```
account object (dynamoDB_table):

{
 "PK": {
  "S": "111"
 },
 "SK": {
  "S": "acct#"
 }
 //...
}
-----------------------------
GSI2 index (dynamoDB_table):

PK, ... GSI2_PK, GSI2_SK, profileId
0,  ... 111,    PERSON,  222
1,  ... 111,    PERSON,  333

-----------------------------
profile_222 object (dynamoDB_table):
{
 "PK": {
  "S": "222"
 },
 "SK": {
  "S": "111"
 }
 //...
}
profile_333 object (dynamoDB_table):
{
 "PK": {
  "S": "333"
 },
 "SK": {
  "S": "111"
 }
 //...
}
```

FIG. 7A

700B

| accountId | namespace |
| --- | --- |
| 100 | 10001000 |
| 101 | 10001000 |
| 111 | 10001000 |

FIG. 7B

700C

```
{
  "s3FileRequest": {
    "bucketName": "dyanmo-bulk-update-e2e",
    "prefix": "output/namespace_upd"
  },
  "executionParameters": {
    "parallelFilesProcessing": false,
    "parallelRecordsProcessing": true
  },
  "dynamoMixRequest": {
    "updateNode": {
      "tableName": "dynamoDB-recovery-practise",
      "pkTemplate": "${accountId}",
      "skTemplate": "acct#",
      "updateExpressions": [
        {
          "expression": "#namespace = :namespace"
        }
      ],
      "expressionAttributeValues": {
        ":namespace": {
          "s": "${namespace}"
        }
      },
      "children": [
        {
          "tableName": "dynamoDB-recovery-practise",
          "indexName": "GSI2",
          "pkName": "GSI2_PK",
          "skName": "GSI2_SK",
          "pkTemplate": "${accountId}",
          "skTemplate": "PERSON",
          "children": [
            {
              "tableName": "dynamoDB-recovery-practise",
              "pkTemplate": "${profileId}",
              "skTemplate": "${accountId}",
              "updateExpressions": [
                {
                  "expression": "#namespace = :namespace"
                }
              ],
              "expressionAttributeValues": {
                ":namespace": {
                  "s": "${namespace}"
                }
              }
            }
          ]
        }
      ]
    }
  }
}
```

FIG. 7C

HIERARCHICAL QUERY BASED TRANSACTION EXECUTION COORDINATION SYSTEM

INTRODUCTION

Aspects of the present disclosure relate to scalable data updates in a non-relational database, and more particularly to a method and system for executing dynamic hierarchical queries to maintain data consistency across related entities in a distributed database environment while providing a configurable, reusable framework for data updates at scale.

BACKGROUND

Non-relational database systems (e.g., which may be referred to as "NoSQL" databases) such as Amazon® DynamoDB® have become widely adopted for their ability to scale horizontally and deliver low-latency performance in distributed environments. Organizations often model complex business entities across multiple tables or items, and are required to ensure that updates to related data remain consistent as workloads grow. Unlike traditional relational databases, non-relational systems do not provide built-in support for "join" operations, making the coordination of updates across multiple related items more challenging.

Developers frequently rely on custom scripts or one-off utilities to perform data fixes, migrations, and bulk updates in non-relational databases. Each new update scenario typically requires writing new code or modifying existing scripts, resulting in significant development overhead and inconsistencies across teams. These custom code based approaches often result in redundant and/or inefficient transactions. As dataset sizes increase, such methods become increasingly difficult to maintain and are prone to errors, and they may not easily adapt to changing requirements and context.

Existing orchestration and pipeline frameworks may offer batch processing and parallel execution capabilities, but these frameworks typically lack efficiency due to the unstructured approach to transaction processing and the absence of relational information in the database that could otherwise enable relationship-based processing. The unstructured nature of such existing techniques also creates difficulties in auditing or resuming interrupted processes.

As a result, there remain significant technical challenges in managing scalable, consistent, and flexible data updates in non-relational database environments, particularly when dealing with complex relationships and large volumes of data.

BRIEF SUMMARY

According to an aspect of the present disclosure, a method for executing scalable, atomic data updates in a non-relational database is provided. The method may include: receiving a tree-structured query with one or more placeholders, the tree-structured query representing relationships between multiple database objects in the non-relational database; parsing one or more input data files from a storage location; generating a resolved query by dynamically replacing the one or more placeholders in the tree-structured query with one or values based on data determined from the parsing of the one or more input data files and based on the relationships in the tree-structured query; combining multiple operations for related objects of the multiple database objects into a single atomic transaction based on the resolved query; and executing the single atomic transaction against the non-relational database.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates example code of an update query related to executing scalable, atomic data updates in a non-relational database, according to aspects of the present disclosure.

FIG. 5 illustrates example code of a put query related to executing scalable, atomic data updates in a non-relational database, according to aspects of the present disclosure.

FIG. 6 illustrates example code of a query related to executing scalable, atomic data updates to multiple objects in a non-relational database, according to aspects of the present disclosure.

FIGS. 7A, 7B, and 7C illustrates example code relating to a query for executing scalable, atomic data updates to objects with a one-to-many relationship in a non-relational database, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
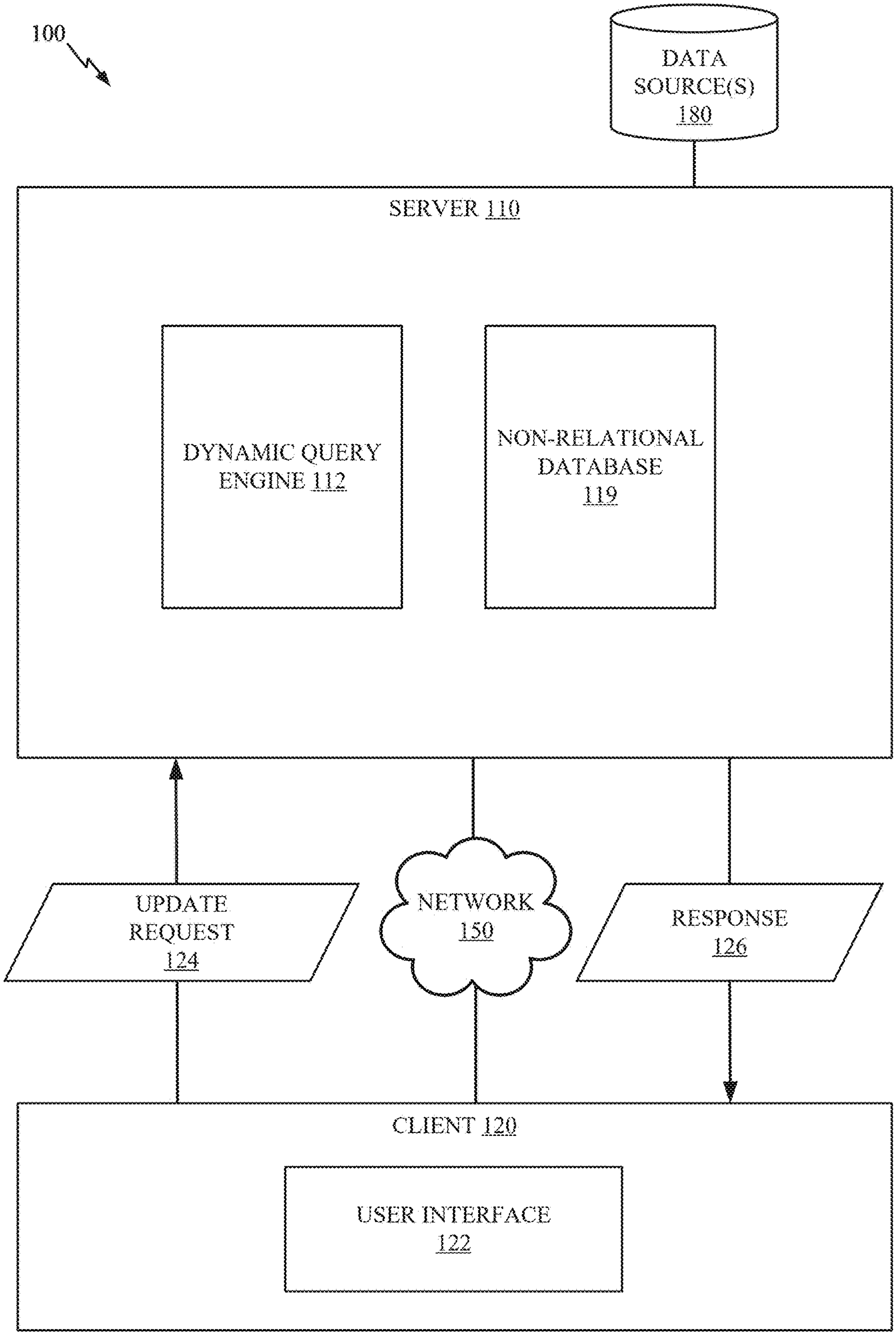
FIG. 1 illustrates a block diagram of a computing environment for executing scalable, atomic data updates in a non-relational database, according to aspects of the present disclosure.

The present disclosure relates to a method and system for executing scalable, atomic data updates in a non-relational database. The system described herein is a hierarchical query based transaction execution coordination system, designed to address the technical challenges of performing scalable, atomic data updates in non-relational (e.g., NoSQL) databases. Aspects described herein introduce a series of technical improvements that fundamentally change how complex data updates are managed in distributed database environments.

Conventionally, organizations have relied on custom scripts or ad hoc functionality to perform data fixes, migrations, and bulk updates in non-relational databases. These methods are often inefficient, error-prone, and difficult to maintain, especially as data volumes grow and systems evolve. Each new update scenario often requires new code in conventional techniques, leading to redundant efforts and inconsistent practices across teams. Existing batch processing tools and pipeline frameworks applied to non-relational databases also lack the ability to coordinate updates across related entities in a structured, atomic manner, and they provide limited support for monitoring, error handling, or recovery.

Techniques described herein overcome these technical problems through several key technical advancements. The present disclosure introduces a declarative, tree-structured query framework that allows for definition of hierarchical relationships between database objects. This enables coordinated updates across multiple related entities within a single, atomic transaction, which is something not natively supported in non-relational database systems. The use of placeholders and built-in functions within these queries according to aspects of the present disclosure allows for dynamic substitution of values at execution time, drawing from input files or parent nodes, and supports sophisticated runtime data transformations using expression languages such as MVFLEX Expression Language (MVEL). As a result, complex update scenarios can be configured and reused without the need for code changes, dramatically reducing development overhead, improving execution efficiency, and reducing the risk of errors.

Another significant improvement accomplished by techniques described herein is the ability to execute operations in parallel using reactive streams. This approach allows for high-performance processing of large datasets, with configurable throughput and the ability to process large numbers of records efficiently. By bundling multiple operations, including updates and puts, into a single atomic transaction, the system significantly enhances the resource efficiency of performing such operations while ensuring data consistency across related objects, addressing a fundamental challenge in non-relational database management.

Aspects of the present disclosure also feature integrated progress tracking and fault tolerance. For example, by tagging input files with status and metadata as an update process moves forward, techniques described herein provide robust monitoring and auditability, and enable seamless recovery or resumption of processing in the event of failures. Built-in verification mechanisms further ensure that updates are correctly applied, with support for retries to handle the eventual consistency model of distributed databases. Any failed records may be logged and stored separately for later review or reprocessing.

Thus, techniques described herein provide a robust, scalable, and flexible solution for managing complex data updates in non-relational database environments. By combining a hierarchical, declarative query model with dynamic data transformation, atomic transaction bundling, parallel execution, and/or integrated progress tracking, aspects of the present disclosure address the technical shortcomings of existing tools and practices in the context of non-relational databases (e.g., such as a lack of efficiency and scalability due to the non-relational nature of such systems and the lack of reusability, adaptivity, auditability, and fault tolerance of existing techniques). The result is a system that significantly improves reliability, maintainability, and performance for large-scale data operations, offering a clear technical advantage over prior approaches.

Example Computing Components Related to Executing Scalable Atomic Data Updates in a Non-Relational Database FIG. 1 illustrates a block diagram of a computing environment 100 related to executing scalable, atomic data updates in a non-relational database. The computing environment 100 may include a server 110 and a client 120 connected via a network 150.

Server 110 may comprise one or more processors and a memory storing instructions. In some cases, server 110 may be an application server or other computing device that hosts a computing application accessed by one or more users, such as via user interface 122 on client 120.

The client 120 be a computing device by which a user interacts with a computing application, and may include a user interface 122 that enables such interaction. The client 120 may send an update request 124 through the network 150 to the server 110, and may receive a response 126 back through the network 150. For example, update request 124 may be a request to update non-relational database 119 based on one or more input files (e.g., which may be located in one or more data source(s) 180). Update request 124 may be generated based on input received via user interface 122, such as a user requesting an update of non-relational database 119 based on one or more input files. In some aspects, update request 124 may be triggered automatically, without user input, such as based on some triggering condition (e.g., passage of a time period, reaching a threshold amount of input files with pending data changes, reaching a threshold amount of pending record changes, or the like).

Update request 124 may include a variety of information necessary for executing scalable, atomic data updates in a non-relational database environment. In some aspects, the request contains a tree-structured query that defines hierarchical relationships between multiple database objects, allowing for coordinated updates across related entities. This query may incorporate placeholders for dynamic value substitution, enabling the system to draw data from input files or parent nodes at execution time. Additionally, update request 124 can specify the location(s) of one or more input data files such as comma separate value (CSV) files and/column oriented files (e.g., Parquet files), such as in data source(s) 180, along with, in some aspects, configuration parameters for parallel processing, throughput limits, and/or conditional execution logic. Placeholders in the tree-structured query may also include built-in functions and/or runtime expressions for data transformation, as well as criteria for verification and error handling in some aspects. By providing these elements, update request 124 enables the system to efficiently process complex update scenarios, maintain data consistency, and support flexible, reusable workflows without requiring code changes.

Server 110 may generate response 126 through a process that involves automated processing of update request 124, generation of efficient atomic transactions, and execution of such transactions against non-relational database 119.

Server 110 may contain multiple components for processing of update requests.

Dynamic query engine 112 generally represents one or more components responsible for processing update request 124 and orchestrating the execution of scalable, atomic data updates to non-relational database 119. In some aspects, dynamic query engine 112 may retrieve any input files indicated in update request 124. For example, dynamic query engine 112 may retrieve one or more input files from data source(s) 180 by referencing the file locations specified in update request 124. These input files, which may include formats such as CSV or Parquet, are typically stored in cloud storage solutions (e.g., data source(s) 180 may represent one or more of such cloud storage components and/or one or more other local and/or remote locations at which input files may be stored). For example, dynamic query engine 112 may access each such designated storage location, retrieve the relevant file(s), and parse their contents to extract the data needed for placeholder resolution and query execution. This process ensures that the most current and relevant data is used to drive the update operations within the non-relational database.

Dynamic query engine 112 (or, in some aspects, a sub-component of dynamic query engine, such as a placeholder resolution mechanism) may parse the tree-structured query in update request 124 and resolve any placeholders using data from input file(s) and/or parent node(s), applying built-in functions and/or runtime expressions as appropriate for data transformation. In some aspects, dynamic query engine 112 may then generate a set of coordinated operations such as updates and puts across related database objects, bundling them into a single atomic transaction to ensure data consistency. In some aspects, update and put operations may be combined with one another into a single (e.g., mixed) request and executed as part of one atomic transaction. Leveraging parallel processing capabilities in some aspects, dynamic query engine 112 may execute these atomic transactions efficiently, handling large volumes of data with configurable throughput. Parallel processing may be performed at the input file level (e.g., processing multiple input files in parallel with one another) and/or at the record level (e.g., processing updates to multiple records in parallel with one another). At various stages of the process, dynamic query engine 112 may track progress, manage error handling, and/or perform verification to confirm that updates are correctly applied. This comprehensive functionality enables dynamic query engine 112 to automate complex update scenarios, reduce manual intervention, and maintain the integrity of data within non-relational database 119. Functionality of dynamic query engine 112 is described in more detail below with respect to FIGS. 2 and 3.

Transactions, which may be atomic transactions generated by bundling multiple coordinated operations such as updates and/or puts together based on the resolved query, may be executed against the non-relational database (e.g., sequentially or in parallel). A transaction manager within dynamic query engine 112 may ensure that all included operations are applied together or not at all, thereby maintaining data consistency. If a transaction is successful, the changes are committed, but if any part fails, the entire transaction may be rolled back, preventing partial updates and preserving the integrity of the database.

Response 126 may be generated by dynamic query engine 112 after processing update request 124, and serves as an indication of the outcome of the requested data update. If the update request is successfully executed, response 126 confirms the completion of all intended operations and may include details such as transaction identifiers or processing summaries. In the event of a failure, response 126 may provide information about the error, including which operations failed and any relevant error codes or messages, enabling review, troubleshooting, and/or retrying of the update as appropriate.

Response may be displayed via user interface 122. For example, a user of client 120 may receive response 126 via user interface 122, and may take action based on response 126 as appropriate (e.g., to retry the query or address an issue related to non-relational database 119). In some cases, one or more action may be automatically triggered by response 126, such as retrying update request 124, blocking or delaying one or more subsequent update requests (e.g., until an issue indicated in response 126 is resolved), and/or the like.

In some aspects, an interrupted process may be resumed according to techniques described herein, such as if processing of an update request is interrupted prior to completion. For example, if a hardware or software issue occurs, some trigger event is detected, or input requesting interruption is received, processing of an update request may be interrupted. Subsequently, the update request can be resumed based on the recorded status information. For instance, if the status information indicates that certain input files and/or records have already been successfully processed (e.g., based on statuses of "processed") but other particular input files and/or records were not yet successfully processed prior to the interruption (e.g., based on statuses of "in progress" and/or "failed" and/or no particular status yet being recorded), then resuming the update operation may involve restarting processing for only the records that were not yet successfully processed prior to the interruption. Thus, unlike prior techniques, aspects of the present disclosure enable robust fault tolerance and resuming of interrupted processes.

Figure 2:
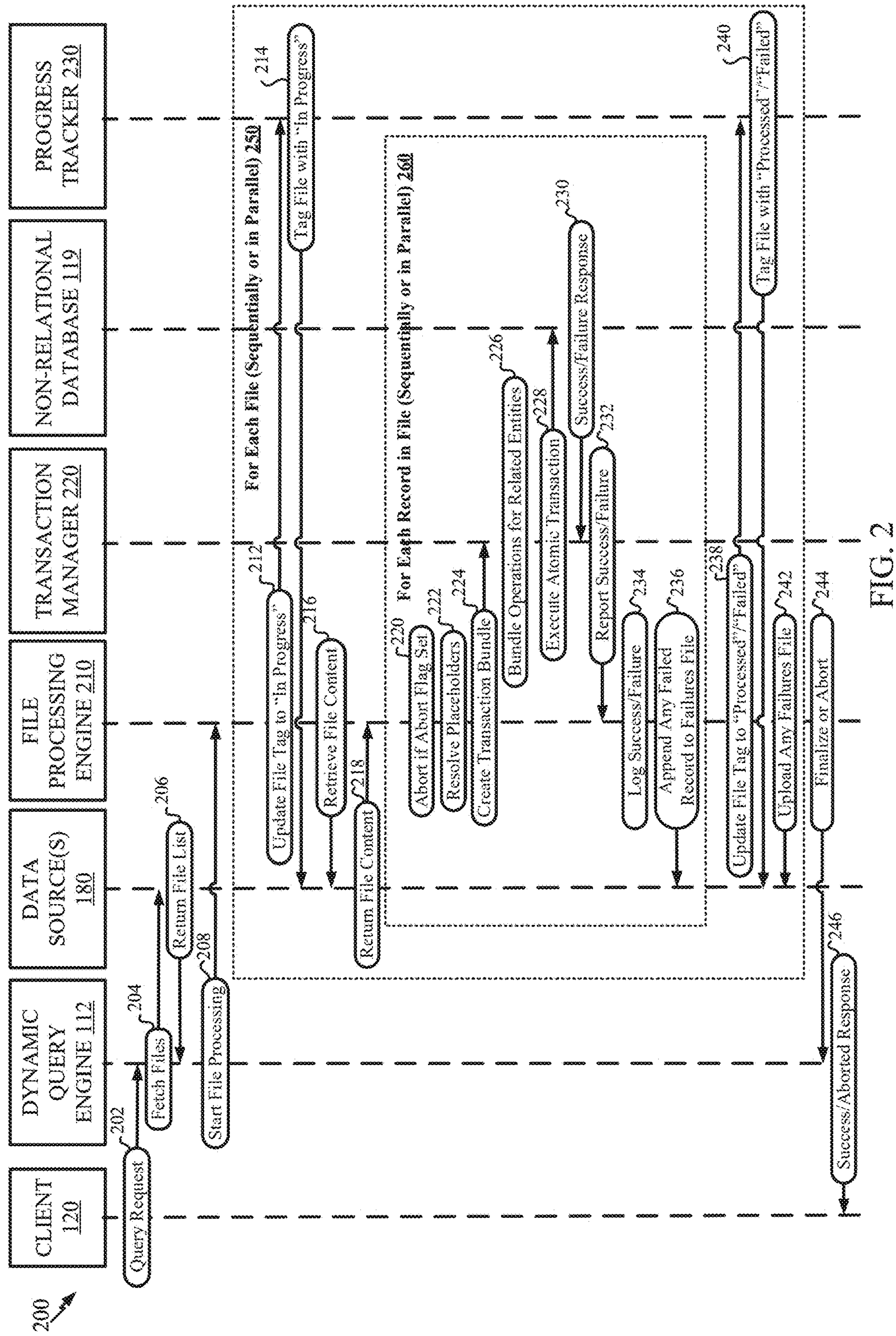
FIG. 2 is a sequence diagram illustrating a workflow related to executing scalable, atomic data updates in a non-relational database, according to aspects of the present disclosure.

Example Sequence Diagram for Executing Scalable, Atomic Data Updates in a Non-Relational Database FIG. 2 is a sequence diagram 200 illustrating a workflow related to executing scalable, atomic data updates in a non-relational database, according to aspects of the present disclosure. Sequence diagram 200 includes client 120, dynamic query engine 112, data source(s) 180, and non-relational database 119 of FIG. 1. Sequence diagram 200 also includes file processing engine 210, transaction manager 220, and progress tracker 230, which may (for example) represent subcomponents of dynamic query engine 112. File processing engine 210, transaction manager 220, and/or progress tracker 230 may also be implemented independently of dynamic query engine 112 and/or of one another. Accordingly, the workflow is configured to process input files, resolve placeholders, create transaction bundles, execute atomic transactions, and track progress, thereby ensuring data consistency and scalability.

There is a need for reliable mechanisms to initiate query requests and retrieve files from external storage. At block 202, client 120 transmits a query request to dynamic query engine 112. The query request may include a tree-structured query defining relationships between database objects. The query request may also include parameters such as the location of input files, execution settings, and/or the like. Upon receiving the request, at block 204 dynamic query engine 112 fetches file identifiers from data source(s) 180, which may be (for example) one or more Amazon® Simple Storage Service® (S3) buckets and/or other types of cloud data sources or the like. Data source(s) 180 may return a list of file identifiers at block 206. Dynamic query engine 112 starts file processing (e.g., via file processing engine 210) at block 208.

In some embodiments, file processing engine 210 (which may also be referred to as an input processor) initializes file processing either sequentially or in parallel based on the configuration parameters provided in the query request.

Block 250 represents a sequence of operations that may be performed for each file in the file list (e.g., the list of input file identifiers returned at block 206), either sequentially (one file at a time) or in parallel (for multiple files simultaneously, such as using a parallel processing scheme that involves multiple processing components, threads, cores, processors, and/or the like).

Within block 250, for each given file, file processing engine 210 updates the file tag to “In Progress” at block 212, such as by sending a message to progress tracker 230 (which may be referred to as a progress tracking system), and progress tracker 230 subsequently tags the file with the “In Progress” status at block 214 (e.g., by sending a message to data source(s) 180 to record the tag in metadata associated with the file). As a result, visibility into the processing status of each file is provided and maintained throughout the process.

Before record-level processing begins, file processing engine 210 retrieves the content of the file from data source(s) 180 at block 216, and retrieved file content is then returned to file processing engine 210 at block 218 for downstream operations. Block 260 represents a sequence of operations that may be performed for each record in the file (e.g., each record that will be used to update non-relational database 119), either sequentially (one record at a time) or in parallel (for multiple records simultaneously, such as using a parallel processing scheme that involves multiple processing components, threads, cores, processors, and/or the like).

Within block 260, for each record, file processing engine 210 evaluates whether an abort flag has been set. The abort flag may be set through a dynamic configuration mechanism, such as a configuration file or a runtime parameter, which can be updated during execution. This flag is commonly used to provide a manual or automated means to halt processing in response to specific conditions, such as detection of a severe error, an unskippable issue, or an operational requirement to stop the job. For example, if a significant error occurs, such as a missing field that is required for processing, a syntax error in the query, or a database table not found, the abort flag can be set to prevent further processing and/or to avoid potential data corruption or unintended updates. The abort flag may also be set by an administrator or automated monitoring system if it is determined that the job needs to be stopped due to resource constraints, irregular behavior, or other operational considerations. If the abort flag is set, file processing engine 210 detects the flag and aborts processing for the affected records or files at block 220, ensuring that no further operations are performed until the issue is resolved. Otherwise (if the abort flag has not been set), operations proceed to block 222 where any placeholders within the tree-structured query are resolved by utilizing data from the current record and/or one or more parent nodes, enabling dynamic substitution of values into the query.

The resolution performed at block 222 may involve dynamically substituting placeholder values in the tree-based query with actual data determined from the current record and/or, where applicable, from parent nodes in the query hierarchy (e.g., according to the hierarchical tree structure of the tree-based query). Placeholders may reference fields from the input data file, such as account identifiers or timestamps, or may utilize system-generated values. The resolution process also supports the use of built-in functions and runtime expressions, enabling data transformation and conditional logic at execution time.

For example, a placeholder may invoke a function to provide a default value if a field is empty, or to encode a value before the value is used in the query.

Runtime expressions can also be used to dynamically transform or evaluate data during the execution of a query, allowing for flexible and context-sensitive operations without requiring code changes. For example, runtime expressions (e.g. written in an expression language) may be used to apply conditional logic, perform calculations, and/or modify values based on the contents of input files or the state of parent nodes in a hierarchical query. This enables the system to adapt to varying data scenarios, enforce business rules, and ensure that updates or inserts are tailored to the specific requirements of each record as it is processed.

An example of a runtime expression is: {{func:defaultIfEmpty(\${dob Version},−1)}}. In this expression, the function defaultIfEmpty checks whether the value of the placeholder $ {dob Version} (which might be extracted from an input file) is empty. If it is empty, the function substitutes the default value-1; otherwise, it uses the actual value of $ {dob Version}. This runtime expression allows the system to automatically handle missing or incomplete data during query execution, ensuring that updates are applied consistently without requiring manual intervention or code changes.

By resolving placeholders in this manner, the system ensures that each operation within the transaction bundle is accurately tailored to the specific data context of the record being processed, supporting flexible, reusable query templates and enabling complex update scenarios without requiring code changes.

At block 224, file processing engine 112 may instruct or otherwise trigger transaction manager 220 to create a transaction bundle at block 226 by grouping related operations, such as updates and/or puts, based on the resolved query (e.g., after performing the resolution at block 222). This bundling process at block 226 may leverage the hierarchical relationships defined in the resolved query, ensuring that all operations affecting related database objects are included together. The transaction manager 220 then assembles these operations so that they are executed as a unified transaction against non-relational database 119. The atomic nature of the transaction guarantees that either all operations within the bundle are successfully applied, or none are, thereby maintaining data consistency and preventing partial updates. This approach enables coordinated updates across multiple entities and supports complex data modification scenarios in a resource efficient manner (e.g., by reducing the number of transactions and preventing incomplete updates) while preserving the integrity of the database. In some cases, creating the transaction bundle involves bundling up to a maximum number of operations for a single transaction as permitted by the non-relational database (e.g., non-relational database 119 may have a limit on the number of operations that are supported per transaction).

Transaction manager 220 then executes the atomic transaction against non-relational database 119 at block 228 to ensure that all operations within the bundle are applied together or not at all. During execution, all grouped operations, such as updates and/or puts, are applied together as a single unit. If all operations in the transaction succeed, the changes are committed; however, if any operation fails, the entire transaction is rolled back, ensuring that no partial updates are made. This mechanism preserves data consistency and integrity across related entities in the database.

At block 230, non-relational database 119 returns a success or failure response, which transaction manager 220 reports to file processing engine 210 at block 232, and which file processing engine 210 logs at block 234, such as for auditing and/or troubleshooting. If any record fails to process, the failed record is appended to a failures file at block 236, and the failure file may be provided to data source(s) 180. The failures file serves as a repository for records requiring reprocessing and/or further investigation.

Once all records in a file are processed (after block 250 has been completed for all records in the file), file processing engine 210 updates the file tag to "Processed" or "Failed" at block 238 based on the outcome, and progress tracker 230 tags the file (e.g., in data source(s) 180) with the corresponding status at block 240, such as including metadata such as timestamps and/or transaction identifiers. In some embodiments, if a failures file was generated, the failures file is uploaded to data source(s) 180 for review or reprocessing at block 242.

After all of the files have been processed (e.g., after block 250 has been competed for all files) the workflow proceeds with file processing engine 210, at block 244, finalizing the operation or aborting as necessary, and dynamic query engine 112 transmitting a success or aborted response back to client 120 at block 246, thereby summarizing the overall outcome.

In some aspects, the system may perform validation on the updated database objects by implementing a verification step after each update operation. Once a transaction is executed, one or more components of the system (e.g., a verification component of dynamic query engine 112) may retrieve the affected database objects and compare their current values against the expected results specified in the update request. This comparison ensures that all intended changes have been correctly applied. The system can use a consistent read option to guarantee that the most up-to-date data is retrieved, even in distributed environments with eventual consistency. If discrepancies are detected, the system may trigger retries or log the failed records for further review and reprocessing. For example, a success/failure outcome for a transaction may be determined, at least in part, based on such validation. This validation process provides an additional layer of assurance that updates are accurate and complete, helping to maintain data integrity and reliability throughout large-scale update operations.

Sequence diagram 200 demonstrates several notable advantages. Parallel processing of files and records enables efficient handling of large datasets. Bundling operations into atomic transactions (e.g., based on hierarchical relationships indicated in a tree-structured query) maintains data consistency across related entities. Runtime placeholder substitution facilitates flexible, reusable query templates and dynamic query execution. File tagging provides visibility into processing status and supports recovery from failures. Failed records may be logged and stored separately, enabling targeted reprocessing. This workflow addresses the challenges of managing complex data updates in non-relational databases by offering a reliable, adaptable, and effective solution.

Figure 3:
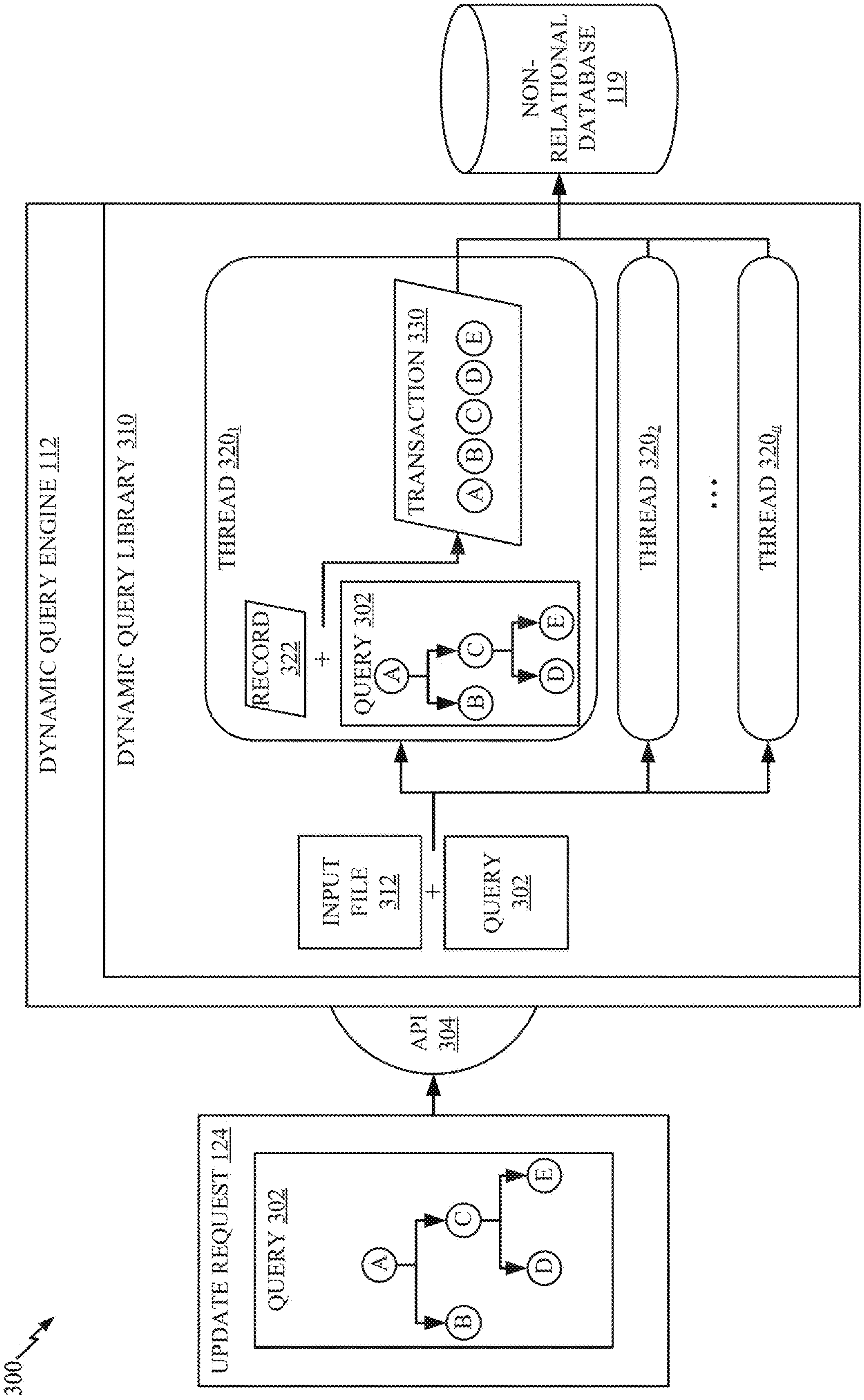
FIG. 3 illustrates a block diagram depicting parallel execution of scalable, atomic data updates in a non-relational database, according to aspects of the present disclosure.

Example Workflow for Parallel Execution of Scalable, Atomic Data Updates in a Non-Relational Database FIG. 3 illustrates a block diagram 300 depicting parallel execution of scalable, atomic data updates in a non-relational database, according to aspects of the present disclosure. Illustration 300 includes update request 12, dynamic query engine 112*m* and non-relational database 119 of FIG. 1. Illustration 300 generally relates to a parallel processing framework for efficient and reliable data updates.

Illustration 300 depicts dynamic query engine 112 receiving one or more update requests, including update request 124, via an application programming interface (API) 304, and interacting with non-relational database 119 to process scalable, atomic data updates while maintaining data consistency across related entities.

For example, API 304 may be an interface through which update requests, including tree-structured queries and associated configuration parameters in some aspects, are received by dynamic query engine 112. API 304 enables external systems or clients to submit requests (e.g., by invoking one or more API functions) for scalable, atomic data updates, facilitating integration with various data sources and supporting automated orchestration of hierarchical query execution within the system. API 304 may also enable returning of responses to update requests, such as indicating a success or failure of processing an update request (e.g., such a response may be returned by an API method to a requesting component).

Update request 124 includes a query 302, which is a tree-structured query that defines hierarchical relationships between database objects. Query 302 may specify update or insert operations and may includes on or more placeholders for dynamic value substitution. During execution, query 302 enables coordinated updates or inserts across related entities by allowing the dynamic query engine 112 to resolve placeholders using data from input files 312 and/or parent nodes, supporting flexible and reusable workflows for scalable, atomic data updates. For instance, query 302 indicates a hierarchical relationship between objects A, B, C, D, and E, such that object A is a parent node of objects B and C and object C is a parent node of objects D and E.

Processing of update request 124 may be orchestrated by dynamic query engine 112 as described herein. As shown, dynamic query engine 112 includes a dynamic query library 310, which may be representative of a variety of different functionality related to parsing, resolving, and executing hierarchical queries an/or progress tracking. In one example, dynamic query library 310 comprises one or more functions, routines, and/or components that perform functionality described above with respect to file processing engine 210, transaction manager 220, and progress tracker 230 of FIG. 2, and may serve as the processing backbone by transforming input data and tree-structured query 302 into executable transactions. The library supports runtime resolution of placeholders and hierarchical relationships, enabling flexible, reusable workflows.

According to certain embodiments, update request 124 arrives via API 304 and includes query 302, which defines hierarchical relationships between database objects. Query 302 may specify update and/or insert operations and include placeholders for dynamic value substitution. Dynamic query engine 112 may use one or more input files, such as input file 312, which can be in CSV, Parquet, or another format, to substitute values into those placeholders. In one example, each input file, including input file 312, is parsed into individual records, such as records 322. If there are multiple input files, they may be processed in parallel (e.g., if file-level parallelism is enabled). The individual records from a given file may also be processed sequentially or in parallel, depending on the configuration of the dynamic query engine 112 (e.g., if record-level parallelism is enabled).

For parallel processing, each record 322 is assigned to a separate thread, such as thread 3201, thread 3202, through thread 320$_n$ (which may be referred to collectively as threads 320), thereby enabling high-throughput processing. Within thread 3201 (the functionality of which may be representative of the functionality performed by each of the threads 320 for corresponding records), the dynamic query engine 112 resolves the tree-structured query 302 against the specific record 322 and generates a corresponding transaction 330. In this context, transaction 330 represents a bundled set of operations, such as updates or inserts, that are executed atomically against non-relational database 119. For example, transaction 330 may include one or more update operations and/or put operations to be performed on all of objects A, B, C, D, and E, which are hierarchically related to one another according to the tree structure in query 302. Bundling operations based on hierarchical relationships among database object may enable efficiency and data consistency.

When transaction 330 is executed against non-relational database 119, if any operation within transaction 330 fails, all operations are rolled back to maintain data consistency. If all operations within transaction 330 succeed, then all changes are committed, and the transaction execution is successful.

Each of threads 3201 through 320, may perform similar functionality, each producing one or more respective atomic transactions to be executed against no-relational database 119. For example, the threads 3201 through **320*n*** may run and process records in parallel with one another.

In certain embodiments, the non-relational database 119 (e.g., a NoSQL database such as Amazon® DynamoDB®) processes the transactions (including transaction 330) generated by threads 320 to update or insert data while upholding the hierarchical relationships defined in query 302. As a result, the system guarantees that related database objects are updated in a single atomic operation.

The architecture depicted in FIG. 3 offers several technical advantages. Scalability is achieved through parallel threads 320, which leverage the horizontal scaling capabilities of non-relational databases to process large datasets efficiently. Atomicity is ensured by bundling operations into transactions 330, preventing partial updates and maintaining consistency while enabling efficient transaction execution. Flexibility is provided by dynamic query library 310, which supports runtime resolution and execution of hierarchical queries. Efficiency is also realized by processing records in parallel, reducing overall processing time and optimizing resource utilization.

Parallel processing may be achieved in some aspects using reactive streams by distributing the execution of update and put operations across multiple threads (e.g., threads 320) or other types of processing units. Reactive streams are a programming paradigm designed to handle asynchronous data processing. In the context of parallel processing, reactive streams facilitate the concurrent execution of operations by distributing workloads across multiple threads or processing units, ensuring that large volumes of data can be processed efficiently and reliably without overwhelming the system (e.g., distribution of workload across threads or processing units may be based on a configured throughput limit or rate limit, which may be specified in an update request or otherwise configured). When applied to data processing, a reactive approach allows the system to process incoming data as soon as it becomes available, dynamically adjusting to workload changes and available system resources. This enables efficient parallel execution, non-blocking operations, and the ability to handle large volumes of data without bottlenecks or unnecessary delays. A stream in this context represents a flow of data, such as records from input files or put or update operations, that can be consumed, transformed, and/or acted upon as each element becomes available. The system can process multiple input files and/or records concurrently, allowing for high-throughput data updates in the non-relational database. Reactive streams provide a framework for managing asynchronous data flows, enabling the system to efficiently handle large volumes of data while maintaining configurable throughput and resource utilization. This approach ensures that operations are executed in parallel, significantly reducing overall processing time and optimizing performance for large-scale update scenarios.

Generally, FIG. 3 illustrates that dynamic query engine 112 is a robust and scalable solution for executing hierarchical queries and managing complex data updates in non-relational database environments.

Example Code for Update Query

FIG. 4 illustrates example code 400 of an update query related to executing scalable, atomic data updates in a non-relational database, according to aspects of the present disclosure. For example, code 400 may represent an example of query 302 of FIG. 3.

In one example, code 400 depicts a JavaScript Object Notation (JSON) structure for an update query designed to execute scalable, atomic data updates in a non-relational database 119, according to embodiments of the present disclosure. Code 400 demonstrates the hierarchical and declarative approach of the system, enabling dynamic updates to related database objects while ensuring data consistency and flexibility. It is noted that a JSON structure is included as an example, and other structure types may be used.

As shown, code 400 begins with an s3FileRequest section, which specifies the location of input data files (e.g., including input data file 312) in an S3 bucket (e.g., one of data source(s) 180). For example, the s3FileRequest section includes a bucketName field identifying the S3 bucket ("dynamo-bulk-update-e2e") where the input files 312 are stored, and a prefix field specifying the folder or path within the bucket ("output/run1/folder") to locate the relevant files. This arrangement allows the system to process multiple files matching the specified prefix.

In one example, the executionParameters section defines the configuration for processing the input data. Specifically, the parallelFilesProcessing flag is set to false, indicating that files will be processed sequentially rather than in parallel. Conversely, the parallelRecordsProcessing flag is set to true, thereby enabling parallel processing of individual records (e.g., including records 322) within each file. This configuration enhances throughput and operational effectiveness when handling large datasets.

Furthermore, the dynamoMixRequest section contains the central update query, which is structured hierarchically to define the relationships and operations for updating database objects. In certain embodiments, the dynamoMixRequest section comprises an updateNode, updateExpressions array, conditionExpression, and expressionAttribute Values mapping, each serving a distinct role in the update process.

In one embodiment, the updateNode represents a database object to be updated. For example, the updateNode includes a tableName field specifying the target DynamoDB table ("account_profile_e2e") and pkTemplate and skTemplate fields defining the partition key ("PK") and sort key ("SK") templates, respectively. These placeholders may be dynamically resolved at runtime based on input data.

The updateExpressions array specifies the fields to be updated and their corresponding values using a declarative syntax. For instance, the expression "#dateOfBirth. #birth- Date=: processedDateOfBirth" updates the birthDate field within the dateOfBirth attribute to the value represented by: processedDateOfBirth, while "#dateOfDeath. #deathDate: processedDateOfDeath" updates the deathDate field within the dateOfDeath attribute to the value represented by: processedDateOfDeath. These expressions employ placeholders to dynamically substitute values during execution.

The conditionExpression ensures that updates are applied only if specific criteria are met. Specifically, the conditionExpression "#dateOfBirth. #dob Version=: dob Version num AND #dateOfDeath. #dodVersion=: dodVersion_num" requires that the dob Version and dodVersion fields match the specified values, thereby preventing unintended overwrites and maintaining data consistency.

According to embodiments of the present disclosure, the expressionAttribute Values section defines the values used in both the update and condition expressions. For example: processedDateOfBirth and: processedDateOfDeath are placeholders dynamically resolved from the input data, while: dob Version_num and: dodVersion_num are numeric values resolved using a defaultIfEmpty function, which may assign a default value of −1 if the corresponding version field is empty.

The use of placeholders and functions demonstrates the system's ability to dynamically resolve values at runtime. As a result, the query represented by code 400 adjusts to varying input data and ensures that default values are applied when required.

The JSON structure of FIG. 4 highlights several technical advantages of the system. The use of placeholders, such as templates, functions, and/or expressions, enables a reusable and configurable approach to defining updates. Built-in functions like defaultIfEmpty facilitate runtime data transformations without requiring code changes. The conditionExpression guarantees that updates are applied only when specific criteria are satisfied, thereby enhancing data integrity. The executionParameters enable efficient configuration of parallel record processing and/or parallel fie processing, optimizing performance for large-scale updates. This example illustrates how the system leverages a hierarchical query structure to manage complex data updates in a distributed, non-relational database environment.

Example Code for Put Query

FIG. 5 illustrates example code 500 of a put query related to executing scalable, atomic data updates in a non-relational database, according to aspects of the present disclosure. For example, code 500 may represent an example of query 302 of FIG. 3.

In one example, code 500 depicts a JavaScript Object Notation (JSON) structure for a put query designed to execute scalable, atomic data updates in a non-relational database 119, according to embodiments of the present disclosure. Code 500 demonstrates the hierarchical and declarative approach of the system, enabling dynamic insertions to related database objects while ensuring data consistency and flexibility. It is noted that a JSON structure is included as an example, and other structure types may be used.

The first section, referred to as S3 File Request, specifies the location of input data files in an S3 bucket. For instance, a "bucketName" field identifies the S3 bucket where the input files are stored, such as "dynamo-bulk-update-e2e," and a "prefix" field specifies the folder or path within the bucket, such as "output/run1/folder." This arrangement allows the system to process multiple files matching the specified prefix.

The Execution Parameters section defines the configuration for processing the input data. In certain embodiments, this section includes a "parallelFilesProcessing" flag set to false, indicating that files will be processed sequentially rather than in parallel, and a "parallelRecordsProcessing" flag set to true, enabling parallel processing of individual records within each file. This configuration may lead to improved throughput and operational efficiency when handling large datasets.

The DynamoMix Request section contains a put query, which is structured hierarchically to define the relationships and operations for inserting database objects. For example, this section includes a "putNodes" array, which defines the nodes or database objects to be inserted. Each node specifies the target table, conditions for insertion, and the structure of the item to be inserted.

In the illustrated example, the "putNodes" array includes a single node. The "tableName" field specifies the target DynamoDB table, such as "account_profile_e2e." The "mvelCondition" field defines a condition using the MVFLEX Expression Language (MVEL), ensuring that the put operation is executed only if the "relationship" field is not null or empty and the "processedGovId" field is not null or empty. The "mvelItemCustomizer" field specifies a custom logic block, written in MVEL, to modify the item dynamically before insertion. For example, if the "associatedAccountId" field is null or empty, the field is removed from the item. The "item" field defines the structure of the database object to be inserted. The partition ky (PK) specifies a template that includes placeholders, such as "{relationship} #," which are dynamically resolved at runtime. The sort key (SK) specifies a template that includes a placeholder for the processed government ID, such as "$ {processedGovId}," and applies a universal resource locator (URL) encoding function to ensure compatibility with DynamoDB. Additional attributes, such as "govType" and "associatedAccountId," are included in the item and may also use placeholders and functions for dynamic value resolution. For instance, the "govType" attribute applies a URL encoding function to the "governmentId_IdType" value, while the "associatedAccountId" attribute references a dynamically resolved value.

According to embodiments of the present disclosure, the put query leverages several dynamic features to enhance flexibility and reusability. Placeholders, such as "relationship" and "{processedGovId}," are dynamically resolved at runtime using data from input files or parent nodes. Built-in functions, such as "func: urlEncode," are used to transform data during execution. For example, the URL encoding function ensures that characters requiring encoding in the "processedGovId" and "governmentId_IdType" fields are properly handled. The use of MVEL conditions and customizers allows for fine-grained control over the insertion logic, ensuring that only valid and complete items are inserted into the database.

In certain embodiments, the put query represented by code 500 provides several technical advantages. The hierarchical structure and use of placeholders enable the query to be easily configured and reused for different datasets without requiring code changes. The integration of functions and runtime expressions allows for sophisticated data transformations during execution. The MVEL-based conditions ensure that put operations are executed only when specific criteria are met, enhancing data integrity. The parallel record processing configuration and/or parallel file processing configuration enables efficient handling of large datasets, thereby reducing overall processing time.

In summary, FIG. 5 illustrates how the system facilitates dynamic and scalable insertions of related database objects in a non-relational database environment, leveraging a declarative and hierarchical query structure to promote adaptability, uniformity, and operational effectiveness.

Example Code for Multi-Object Query

FIG. 6 illustrates example code 600 of a query related to executing scalable, atomic data updates to multiple objects in a non-relational database, according to aspects of the present disclosure. For example, code 600 may represent an example of query 302 of FIG. 3.

In one example, code 600 depicts a JavaScript Object Notation (JSON) structure for an update query designed to execute scalable, atomic data updates in a non-relational database 119, according to embodiments of the present disclosure. Code 600 demonstrates the hierarchical and declarative approach of the system, enabling dynamic updates to multiple related database objects while ensuring data consistency and flexibility. It is noted that a JSON structure is included as an example, and other structure types may be used.

As shown, code 600 begins with an s3FileRequest section, which specifies the location of input data files. In this example, the bucketName field identifies the S3 bucket as "dynamo-bulk-update-e2e," and the prefix field designates the folder "output/run1/folder," allowing the system to locate and process the relevant files.

The executionParameters section defines how the system processes these files. Here, parallelFilesProcessing is set to false, indicating that files will be processed sequentially, while parallelRecordsProcessing is set to true, enabling parallel processing of individual records within each file. This configuration supports efficient, high-throughput data updates.

The core of the request is the dynamoMixRequest section, which defines a hierarchical update operation. The updateNode represents the primary database object to be updated, targeting the "account_profile_e2e" table. The pkTemplate and skTemplate fields specify the partition and sort key templates, using placeholders such as $ {accountId} that are dynamically resolved at runtime from the input data. The updateExpressions array contains an expression to update the birthDate field within the dateOfBirth attribute, setting it to the value of: processedDateOfBirth. The conditionExpression ensures that the update is only applied if the dobVersion field matches the value of: dobVersion_num, providing a safeguard for data integrity. The their actual values, with expressionAttribute Values section maps placeholders to: processedDateOfBirth resolved from the input data and: dobVersion_num using a runtime function to supply a default value of −1 if the corresponding field is empty.

The children array defines a related child update operation, also targeting the "account_profile_e2e" table but using different key templates, with values extracted from the parent node. The child node's updateExpressions update the lastUpdated field in the metadata attribute and set the namespace attribute, with corresponding values provided in the expressionAttribute Values section.

Overall, FIG. 6 demonstrates how the system enables complex, multi-entity updates to be defined in a single, declarative request, supporting dynamic value resolution, conditional logic, and parallel record processing. This approach allows for efficient, consistent, and reusable data update workflows in distributed non-relational database environments.

Example One-to-Many Object Update

FIGS. 7A, 7B, and 7C illustrate an example scenario for executing scalable, atomic data updates to objects with a one-to-many relationship in a non-relational database environment.

In the example, an index in DynamoDB is used to link one account to multiple profiles, ensuring consistency for scenarios such as where a user may have several profiles under a single account or a company account may manage multiple sub-organization profiles. With this approach, the input only requires the account ID, and the system automatically handles the search and linkage.

FIG. 7A illustrates example input file 700A related to executing scalable, atomic data updates to objects with a one-to-many relationships in a non-relational database, according to aspects of the present disclosure. For example, input file 700A may be an example of input file 312 of FIG. 3.

Input file 700A provides a snapshot of the relevant data structures in a DynamoDB table. The file includes an account object with a partition key (PK) of "111" and a sort key (SK) of "acct #". It also shows a GSI2 index, where two entries are associated with the account: both have a GSI2_PK of "111" and a GSI2_SK of "PERSON", with profile IDs "222" and "333" respectively. Additionally, the file lists the corresponding profile objects, profile_222 and profile_333, each with their own PKs ("222" and "333") and SKs referencing the parent account ("111"). This structure demonstrates a one-to-many relationship, where a single account is linked to multiple profile objects through an index.

FIG. 7B illustrates an example representation 700B of data in a non-relational database. For example, representation 700B may be an example of data stored in non-relational database 119 of FIG. 1.

Representation 700B includes a tabular view of the current state of the database. The table lists account IDs alongside their associated namespace values. For example, account IDs 100, 101, and 111 all have the namespace value "10001000". This representation provides a clear overview of the namespace attribute for each account prior to any updates.

FIG. 7C illustrates example code 700C of a query related to executing scalable, atomic data updates to objects with a one-to-many relationship in a non-relational database, according to aspects of the present disclosure. For example, code 700C may represent an example of query 302 of FIG. 3.

Code 700C may represent a JSON-formatted hierarchical update request designed to update the namespace attribute for both the account and its related profiles in a single, atomic operation. The request specifies the S3 location of the input files (e.g., including input file 700A of FIG. 7A) and sets execution parameters to process files sequentially but records in parallel. The dynamoMixRequest section defines an updateNode targeting the "dynamoDB-recovery-practise" table, with pkTemplate and skTemplate set to update the account object. The updateExpressions array specifies that the namespace attribute should be updated to the value provided in the input. The children array defines a hierarchical traversal: first, it uses the GSI2 index to identify all related profiles for the account, and then, for each profile, it issues an update to set the namespace attribute to the same value (e.g., in the database object(s) illustrated in representation 700B of FIG. 7B). This structure enables the system to efficiently propagate the namespace update from the parent account to all associated profiles, ensuring data consistency across related entities.

Together, FIGS. 7A, 7B, and 7C demonstrate how the system can process input data, interpret hierarchical relationships, and execute coordinated updates across multiple related objects in a non-relational database, all within a single, reusable, and declarative request. This approach streamlines complex update workflows and ensures atomicity and consistency in environments where one-to-many relationships are common.

Figure 8:
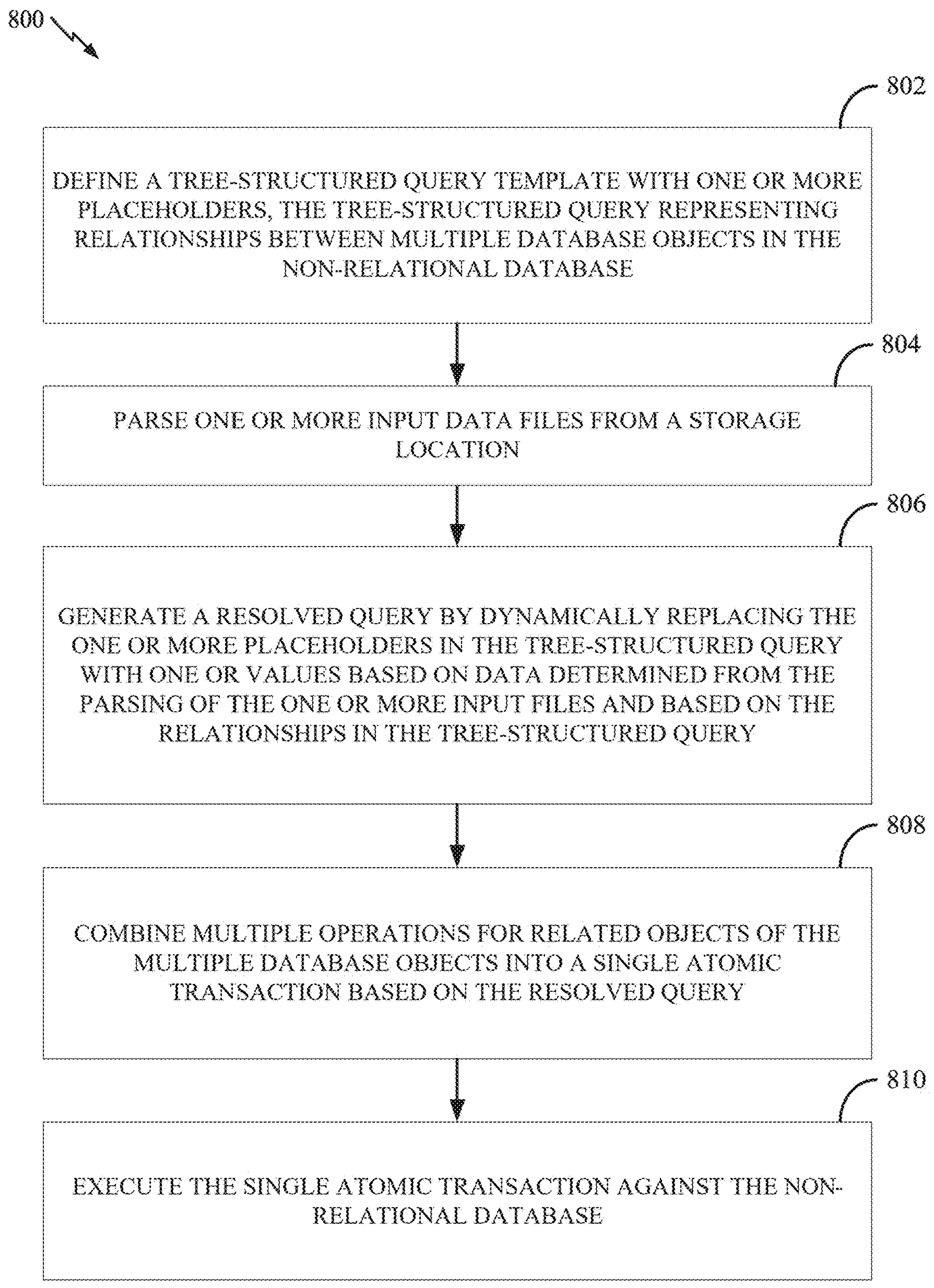
FIG. 8 illustrates a flowchart of operations related to executing scalable, atomic data updates in a non-relational database, according to aspects of the present disclosure.

Example Operations Related to Executing Scalable Atomic Data Updates in a Non-Relational Database FIG. 8 illustrates a flowchart of operations 800 for executing scalable atomic data updates in a non-relational database, according to certain aspects. For example, operations 800 may be performed by one or more components described herein, such as dynamic query engine 112 of FIG. 1 and/or one or more components of FIG. 9A and/or 9B described below.

Operations 800 may begin at a step 802, with receiving a tree-structured query with one or more placeholders, the tree-structured query representing relationships between multiple database objects in the non-relational database. For example, receiving the tree-structured query may comprise receiving the tree-structured query from one or more components, such as a client device, such as based on input received via a user interface.

Operations 800 may continue at step 804, with parsing one or more input data files from a storage location.

Operations 800 may continue at step 806, with generating a resolved query by dynamically replacing the one or more placeholders in the tree-structured query with one or values based on data determined from the parsing of the one or more input files and based on the relationships in the tree-structured query.

Operations 800 may continue at step 808, with combining multiple operations for related objects of the multiple database objects into a single atomic transaction based on the resolved query.

Operations 800 may continue at step 810, with executing the single atomic transaction against the non-relational database. In some aspects, the execution engine is configured to execute the single atomic transaction in parallel with one or more additional transactions using reactive streams.

Some aspects further comprise tagging the one or more input data files with processing status information based at least on the executing of the single atomic transaction against the non-relational database.

In certain aspects the tagging of the one or more input data files further comprises recording transaction identifiers and timestamps and tagging files with statuses comprising one or more of: in progress; processed; or failed.

In some aspects, the tree-structured query further comprises one or more functions, and some aspects further comprise evaluating the one or more functions in order to perform one or more data transformation on at least one of the one or more values that are used to replace the one or more placeholders in the tree-structured query.

In certain aspect, the generating of the resolved query is further based on processing one or more runtime expressions.

Some aspects further comprise comparing updated data based on the executing of the single atomic transaction with one or more expected values in order to perform validation. For instance, the one or more expected values may be specified in the tree-structured query.

In some aspect, the one or more input files comprise one or more comma separated value files or one or more column-oriented files from the storage location.

In certain aspects, the combining of the multiple operations for the related objects of the multiple database objects into the single atomic transaction based on the resolved query comprises bundling up to a maximum number of operations for a single transaction as permitted by the non-relational database.

In some aspects, the multiple operations comprise one or more of: an update operation; or a put operation.

Example Processing Systems

Figure 9A:
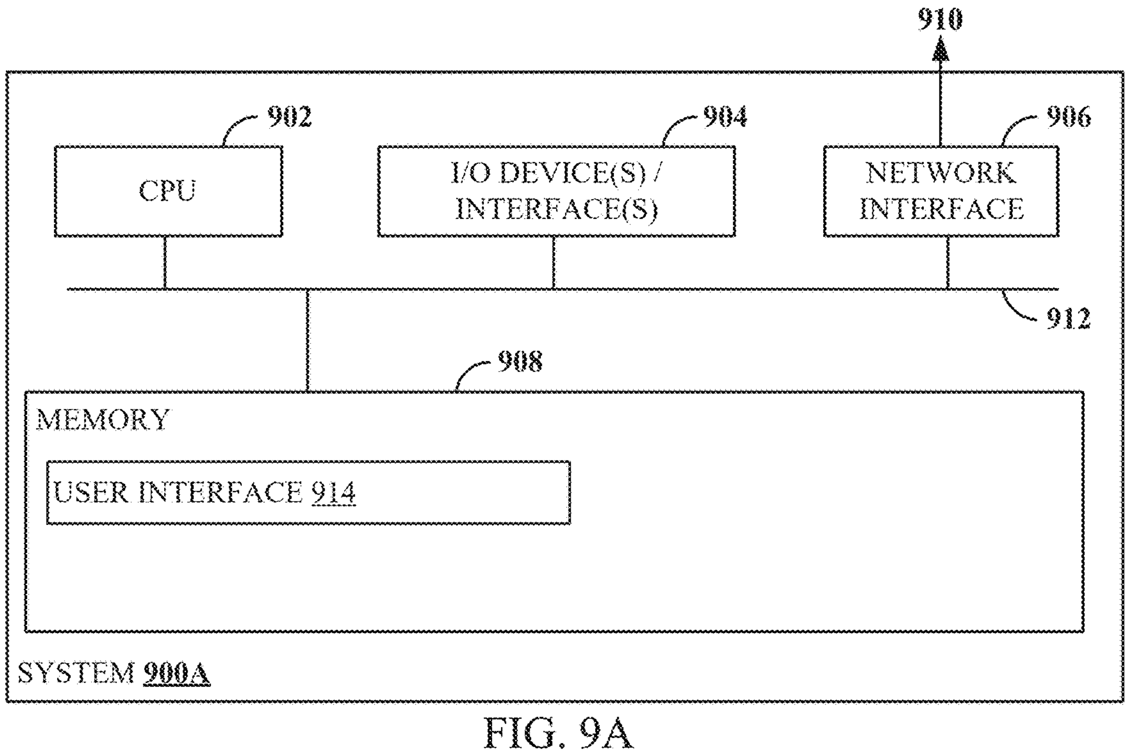
FIG. 9A and FIG. 9B illustrate block diagrams of two computing systems related to executing scalable, atomic data updates in a non-relational database, according to aspects of the present disclosure.

FIG. 9A illustrates an example system 900A with which embodiments of the present disclosure may be implemented. For example, system 900A may be configured to perform aspects of operations 800 of FIG. 8. In one example system 900A corresponds to client 120 of FIG. 1.

System 900A includes a central processing unit (CPU) 902, one or more I/O device interfaces 904 that may allow for the connection of various I/O devices (e.g., keyboards, displays, mouse devices, pen input, etc.) to the system 900A, network interface 906, a memory 908, and an interconnect 912. It is contemplated that one or more components of system 900A may be located remotely and accessed via a network 910. It is further contemplated that one or more components of system 900A may comprise physical components or virtualized components.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, and memory 908. CPU 902 is included to be representative of a single CPU, multiple CPUs, a single CPU having multiple processing cores, and other arrangements.

Additionally, the memory 908 is included to be representative of a random access memory or the like. In some embodiments, memory 908 may comprise a disk drive, solid state drive, or a collection of storage devices distributed across multiple storage systems. Although shown as a single unit, the memory 908 may be a combination of fixed and/or removable storage devices, such as fixed disc drives, removable memory cards or optical storage, network attached storage (NAS), or a storage area-network (SAN).

As shown, memory 908 includes a user interface 914, which may be representative of user interface 122 of FIG. 1. For example, a user may interact with user interface 914 to specify an update request, such as including a tree-structured query, receive information about the success or failure of an update request, initiate retrying of an update request, perform troubleshooting, and/or the like.

Figure 9B:
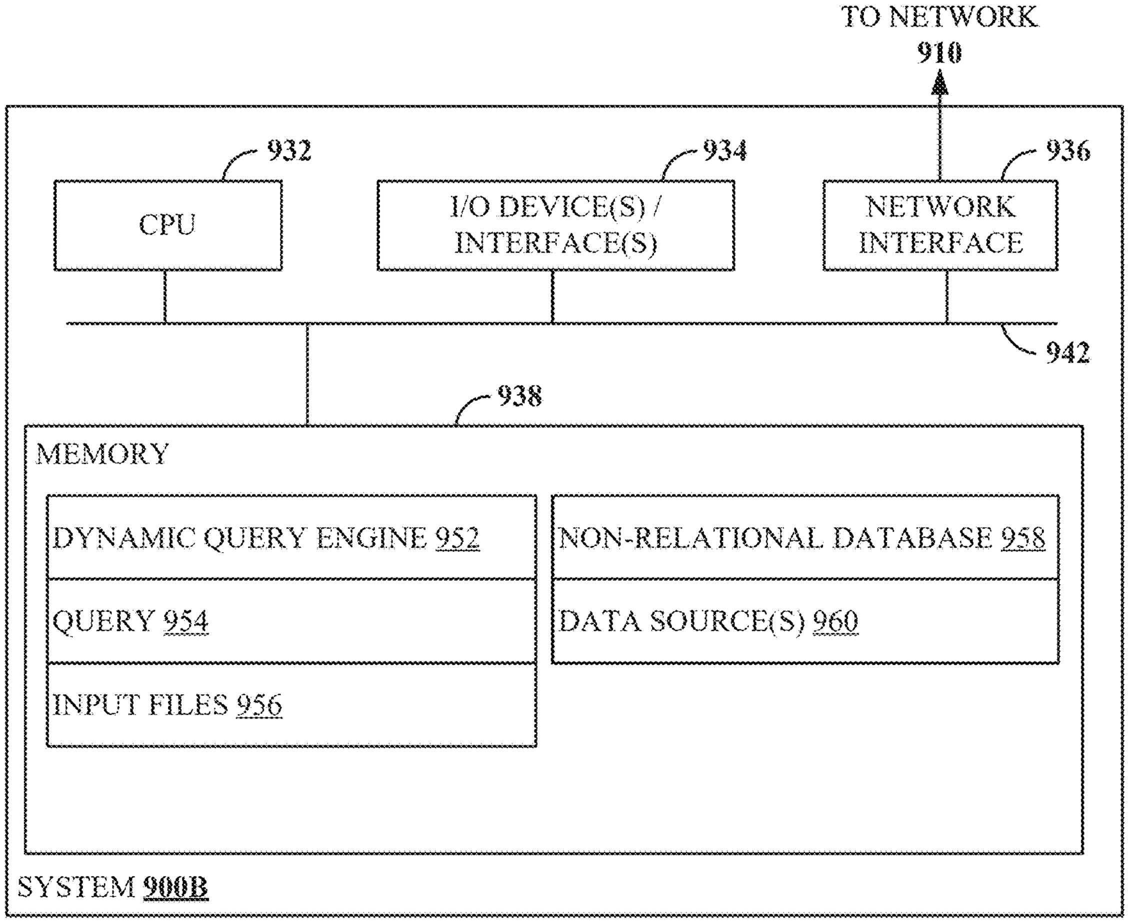

FIG. 9B illustrates another example system 900B with which embodiments of the present disclosure may be implemented. For example, system 900B may correspond to server 110 of FIG. 1, and may be configured to perform aspects of operations 800 of FIG. 8.

System 900B includes a CPU 932, one or more I/O device interfaces 934 that may allow for the connection of various I/O devices (e.g., keyboards, displays, mouse devices, pen input, etc.) to the system 900B, network interface 936, a memory 938, and an interconnect 942. It is contemplated that one or more components of system 900B may be located remotely and accessed via a network 910. It is further contemplated that one or more components of system 900B may comprise physical components or virtualized components.

CPU 932 may retrieve and execute programming instructions stored in the memory 938. Similarly, the CPU 932 may retrieve and store application data residing in the memory 938. The interconnect 942 transmits programming instructions and application data, among the CPU 932, I/O device interface 934, network interface 936, and memory 938. CPU 932 is included to be representative of a single CPU, multiple CPUs, a single CPU having multiple processing cores, and other arrangements.

Additionally, the memory 938 is included to be representative of a random access memory or the like. In some embodiments, memory 938 may comprise a disk drive, solid state drive, or a collection of storage devices distributed across multiple storage systems. Although shown as a single unit, the memory 938 may be a combination of fixed and/or removable storage devices, such as fixed disc drives, removable memory cards or optical storage, network attached storage (NAS), or a storage area-network (SAN).

As shown, memory 938 includes dynamic query engine 952, non-relational database 958, and data source(s) 960, which may be representative of dynamic query engine 112, non-relational database 119, and data source(s) 180 of FIG. 1.

Memory 938 further includes query 954, which may be representative of update request 124 of FIG. 1, query 302 of FIG. 3, and/or the like. Memory 938 further includes input files 956, which may include input file 312 of FIG. 3, and/or the like.

It is noted that systems 900A and 900B are included as examples, and certain functionality described with respect to systems 900A and/or 900B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of' a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors.

Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for executing scalable, atomic data updates in a non-relational database, comprising:

one or more processors; and a non-transitory computer readable medium storing instructions that, when executed by the one or more processors, cause the system to:

receive a tree-structured query with one or more placeholders, the tree-structured query representing relationships between multiple database objects in the non-relational database, wherein the one or more placeholders include one or more of:

a reference to a field from input data; or a function that, when invoked, performs one or more actions;

parse one or more input data files, including the input data, from a storage location;

based on the parsing of the one or more input data files and the relationships in the tree-structured query, generate a resolved query by performing one or more of:

dynamically replacing a placeholder of the one or more placeholders that includes the reference to the field from the input data with a value determined from the referenced field in the parsed input data; or dynamically replacing a corresponding placeholder of the one or more placeholders that includes the function with a corresponding value produced by invoking the function to perform the one or more actions;

combine operations for related objects of the multiple database objects into a single atomic transaction based on the resolved query; and execute the single atomic transaction against the non-relational database.

2. The system of claim 1, wherein the single atomic transaction is executed in parallel with one or more additional transactions using reactive streams.

3. The system of claim 1, wherein the instructions, when executed by the one or more processors, further cause the system to tag the one or more input data files with processing status information based at least on the executing of the single atomic transaction against the non-relational database.

4. The system of claim 3, wherein the tagging of the one or more input data files further comprises recording transaction identifiers and timestamps and tagging files with statuses comprising one or more of: in progress; processed; or failed.

5. The system of claim 1, wherein the generating of the resolved query is further based on processing one or more runtime expressions.

6. The system of claim 1, wherein the instructions, when executed by the one or more processors, further cause the system to compare updated data based on the executing of the single atomic transaction with one or more expected values.

7. The system of claim 1, wherein the one or more input data files comprise one or more comma separated value files or one or more column-oriented files from the storage location.

8. The system of claim 1, wherein the combining of the operations for the related objects of the multiple database objects into the single atomic transaction based on the resolved query comprises bundling up to a maximum number of operations for a single transaction as permitted by the non-relational database.

9. The system of claim 1, wherein multiple operations comprise one or more of:

an update operation; or a put operation.

10. A method for executing scalable, atomic data updates in a non-relational database, comprising:

receiving a tree-structured query with one or more placeholders, the tree-structured query representing relationships between multiple database objects in the non-relational database, wherein the one or more placeholders include one or more of:

a reference to a field from input data; or a function that, when invoked, performs one or more actions;

parsing one or more input data files, including the input data, from a storage location;

based on the parsing of the one or more input data files and the relationships in the tree-structured query, generating a resolved query by performing one or more of:

dynamically replacing a placeholder of the one or more placeholders that includes the reference to the field from the input data with a value determined from the referenced field in the parsed input data; or dynamically replacing a corresponding placeholder of the one or more placeholders that includes the function with a corresponding value produced by invoking the function to perform the one or more actions;

combining operations for related objects of the multiple database objects into a single atomic transaction based on the resolved query; and executing the single atomic transaction against the non-relational database.

11. The method of claim 10, wherein the single atomic transaction is executed in parallel with one or more additional transactions using reactive streams.

12. The method of claim 10, further comprising tagging the one or more input data files with processing status information based at least on the executing of the single atomic transaction against the non-relational database.

13. The method of claim 12, wherein the tagging of the one or more input data files further comprises recording transaction identifiers and timestamps and tagging files with statuses comprising one or more of: in progress; processed; or failed.

14. The method of claim 10, wherein the generating of the resolved query is further based on processing one or more runtime expressions.

15. The method of claim 10, further comprising comparing updated data based on the executing of the single atomic transaction with one or more expected values in order to perform validation.

16. The method of claim 10, wherein the one or more input data files comprise one or more comma separated value files or one or more column-oriented files from the storage location.

17. The method of claim 10, wherein the combining of the operations for the related objects of the multiple database objects into the single atomic transaction based on the resolved query comprises bundling up to a maximum number of operations for a single transaction as permitted by the non-relational database.

18. A non-transitory computer readable medium comprising instructions that, when executed by one or more processors of a computing system, cause the computing system to:

receive a tree-structured query with one or more placeholders, the tree-structured query representing relationships between multiple database objects in a non-relational database, wherein the one or more placeholders include one or more of:

a reference to a field from input data; or a function that, when invoked, performs one or more actions;

parse one or more input data files, including the input data, from a storage location;

based on the parsing of the one or more input data files and the relationships in the tree-structured query, generate a resolved query by performing one or more of:

dynamically replacing a placeholder of the one or more placeholders that includes the reference to the field from the input data with a value determined from the referenced field in the parsed input data; or dynamically replacing a corresponding placeholder of the one or more placeholders that includes the function with a corresponding value produced by invoking the function to perform the one or more actions;

combine operations for related objects of the multiple database objects into a single atomic transaction based on the resolved query; and execute the single atomic transaction against the non-relational database.

* * * * *